US007102798B2

(12) United States Patent
Haines et al.

(10) Patent No.: US 7,102,798 B2
(45) Date of Patent: Sep. 5, 2006

(54) MEDIA PARAMETER SENSING (75) Inventors: Robert E. Haines, Boise, ID (US);
Judith A. Garzolini, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 831 days.

(21) Appl. No.: 09/981,152

(22) Filed: Oct. 17, 2001

(65) Prior Publication Data

US 2003/0072019 A1    Apr. 17, 2003

(51) Int. Cl.
*G03G 15/00*    (2006.01)
(52) U.S. Cl. .................... 358/471; 399/45; 399/389
(58) Field of Classification Search ............... 358/471; 399/45, 13, 85, 389, 393, 394, 365, 369, 399/370–373, 374, 376
See application file for complete search history.

(56) References Cited

U.S. PATENT DOCUMENTS

| 6,029,020 | A  | * | 2/2000  | Blackman et al. ............. 399/45 |
| 6,047,110 | A  |   | 4/2000  | Smith .......................... 395/111 |
| 6,107,920 | A  |   | 8/2000  | Eberhardt et al. ........ 340/572.7 |
| 6,148,162 | A  |   | 11/2000 | Huston et al. ................. 399/66 |
| 6,335,084 | B1 |   | 1/2002  | Biegelsen et al. |
| 6,353,479 | B1 | * | 3/2002  | Lubawy et al. ............. 358/1.13 |
| 6,766,953 | B1 | * | 7/2004  | Huston et al. .......... 235/462.05 |

* cited by examiner

*Primary Examiner*—Hoang Ngo (57) ABSTRACT

Systems and procedures are described to automatically configure an imaging device to form images on sheets of print media that are loaded in the imaging device. To accomplish this, the imaging device reads, or senses a single marking from at least one side of the sheet of print media. The marking includes data; the data provides orientation information with respect to how the print sheet is loaded in the imaging device. The data further includes a set of media parameter information corresponding to the sheet of print media. The imaging device configures itself to form images on the sheet of print media based on at least a portion of the sensed data from the sheet of print media.

15 Claims, 8 Drawing Sheets

MEDIA PARAMETER SENSING

TECHNICAL FIELD

The described subject matter relates to sensing media parameter information from print media.

BACKGROUND

Conventional imaging devices such as printers, plotters, copiers, facsimile machines and the like, typically utilize various types of print media to print images. Such print media types include paper based media (e.g., glossy paper, semi-glossy paper, matte paper, etc.) as well as non-paper based media (e.g., vellum, film, etc.).

To optimize print quality, an imaging device generally requires a number of parameters such as print modes, color maps, and so on, to be configured. This is because such parameters typically vary with the type of media being utilized. For example, an ink-based imaging device such as an ink jet printer that prints to an overhead transparency (OHT) designed for a laser printer may result in a print that not only may need to re-imaged, but that also may result in gumming-up the internal assembly of the imaging device. This is because ink-based imaging devices use ink and laser-based OHTs do not generally have any ink retention coating. Accordingly, an ink-imaging device may adjust parameters such as printing speed, ink drying time, the amount of ink used, and so on, to suit the particular print media being used.

In yet another example, a laser-based imaging device such as a laser printer that prints on an ink-based OHT may melt the ink-based OHT because ink-based OHTs are not manufactured to withstand the amount of heat typically generated by a laser printer's image fusing process. As a result, the imaging job may not only need to be re-imaged, but the job may also result in the need to replace printer parts if the incompatible print media melted onto internal parts of the laser printer. Accordingly, a laser-imaging device may adjust parameters such as the speed of printing, ink-fusing temperature, biasing voltage, and/or the like, to suit the particular print media being used.

Some imaging devices need to be manually configured to properly operate based on the print media type that is going to be used. Thus, print media type information and instructions are typically written on a media box. However, many users do not read the box or the instructions that accompany the media. If the user re-installs the print media on another printer, the user is often required to either remember or guess the media type. This is because once the user removes the media from the box for installation into the device, the box is generally thrown away, and the media data type and/or other instructions are often lost.

Accordingly, a number of conventional techniques have been developed for an imaging device to identify the particular type of print media that is loaded into an imaging device. For example, U.S. Pat. No. 6,148,162 to Huston et al., assigned to the assignee hereof, and incorporated herein by reference, describes marking each sheet of print media with eight separate indicia by imprinting the markings either on the face of each media sheet or on the side of each media sheet.

Figure 1:
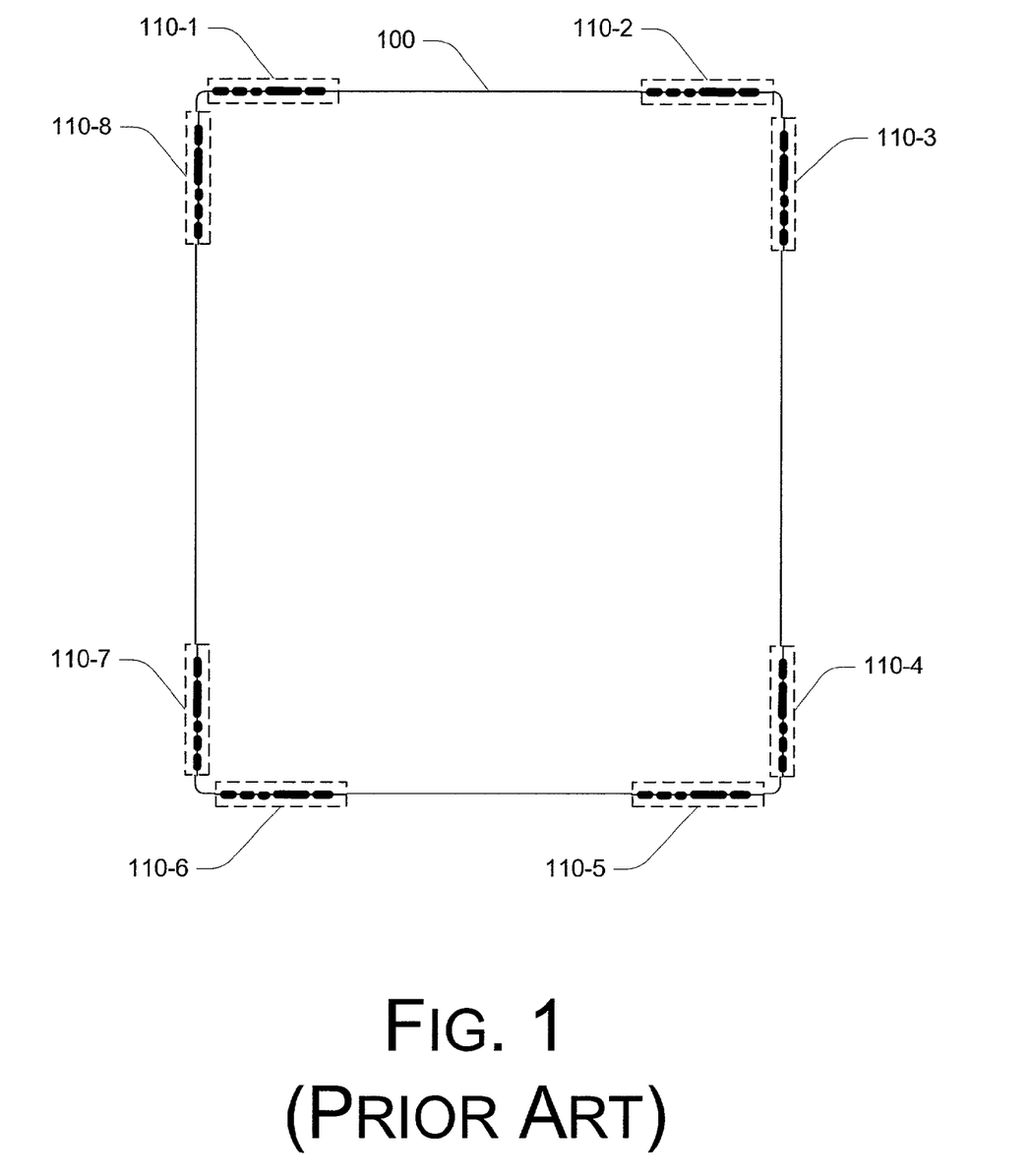
FIG. 1 is a block diagram that shows marking each sheet of print media in eight (8) different places with ink in a barcode pattern to identify print media parameters.

FIG. 1 is a block diagram that shows marking each sheet of print media 100 in eight different places with ink in a barcode pattern 110 to identify print media parameters. I.e., two (2) barcodes are printed for detection on each margin or side of a sheet of media, which has four (4) margins/sides—top (barcodes 110-1 and 110-2), right (barcodes 110-3 and 110-4), bottom (barcodes 110-5 and 1110-6), and left (barcodes 110-7 and 110-8). Such a conventional procedure to provide print media parameters to a printer has a number of disadvantages.

One disadvantage, for example, is that print media marking costs can be substantially increased by the requirement to mark each sheet of print media with eight separate barcodes. An additional disadvantage is that up to eight separate sensors (e.g., optical sensors) are required to sense the sheet's eight markings—one dedicated sensor per marking. Requiring so many sensors generally increases printer fabrication costs.

Accordingly, the various implementations of the following described subject matter address these and other problems of conventional techniques to provide print media parameters to printing devices.

SUMMARY

Systems and procedures are described to automatically configure an imaging device to form images on sheets of print media that are loaded in the imaging device. To accomplish this, the imaging device reads, or senses a single marking from at least one side of the sheet of print media. The marking includes data. The data provides orientation information with respect to how the print sheet is loaded in the imaging device. The data further includes a set of media parameter information corresponding to the sheet of print media. The imaging device configures itself to form images on the sheet of print media based on at least a portion of the sensed data from the sheet of print media.

BRIEF DESCRIPTION OF THE DRAWINGS

FIG. 5 shows an exemplary encoding of print media orientation information in marked indicia on a sheet of print media. Specifically.

FIG. 6 shows an exemplary encoding of print media orientation information in marked indicia on a sheet of print media. Specifically.

DETAILED DESCRIPTION

Figure 2:
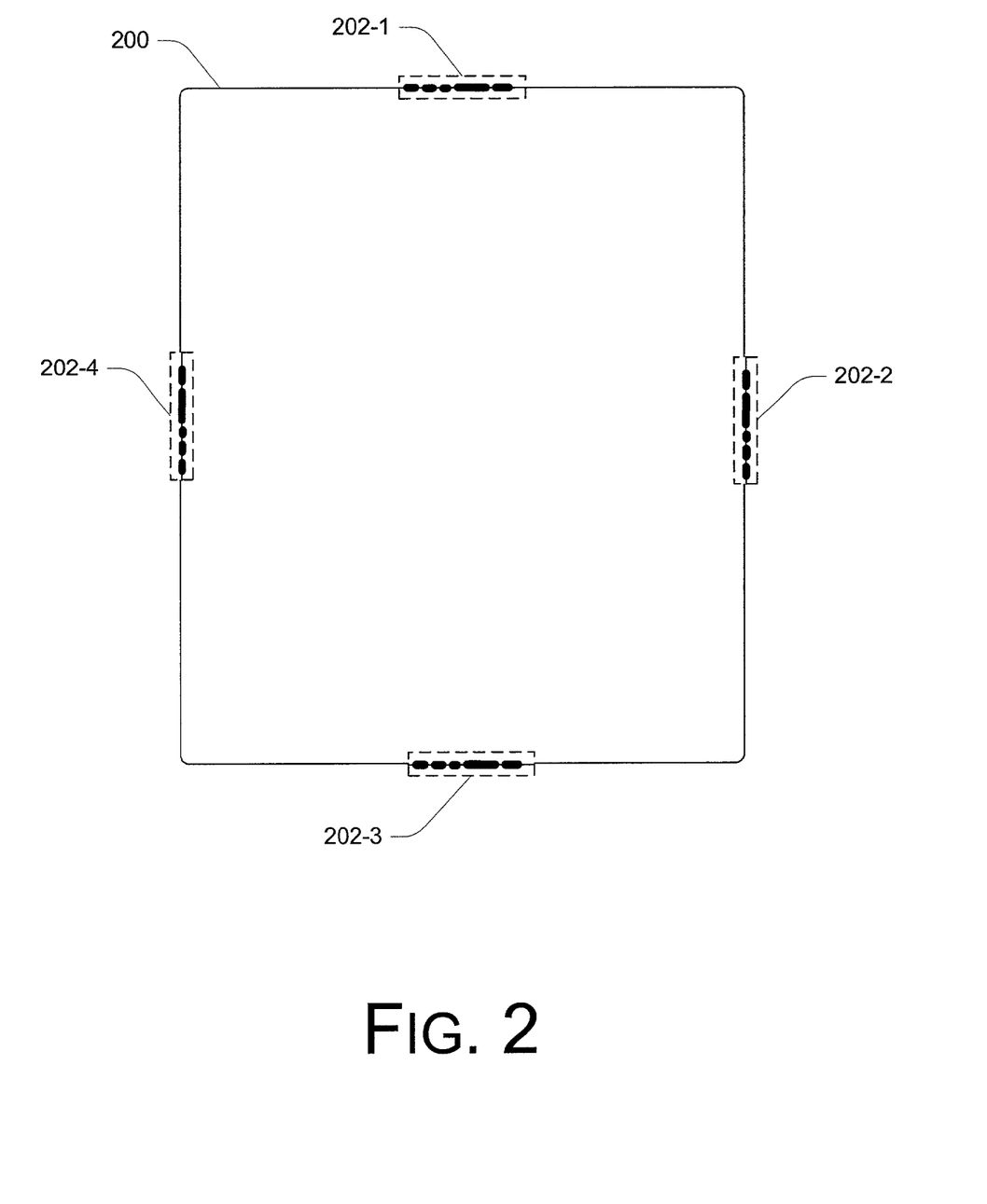
FIG. 2 shows an exemplary media parameter identification sheet.

FIG. 2 illustrates an exemplary media parameter identification sheet 200. The sheet includes a number of markings 202 comprising media parameter information such a brand name, a media name, a media type (e.g., paper, plastic, coated, etc.), size, thickness, weight, manufacturer, media form (e.g., labels, checks, envelopes, etc.), color table, device compatibility, speed at which the media can be fed into a device, fusing temperatures, drying time, valid orientations, duplex options, temperature and humidity ranges, surface roughness, wicking, quantity/length, reorder address, and so on. One or more of the markings 202 are sensed, or read by an imaging device to determine the media parameters that correspond to the sheet. (Although this example illustrates the markings as barcodes, other types of markings could be used as well such as character-based markings that can be interpreted by an optical character recognition (OCR) computer program).

Moreover, the marked indicia 202 are imprinted using a novel imprinting scheme to provide print sheet 200 orientation information to an imaging device. (Such an imaging device is described in greater detail below in reference to the exemplary imaging device 712 of FIGS. 7 and 8). The sensed orientation information indicates to the imaging device whether print media is loaded into the imaging device face-up or facedown, and which side (i.e., the top, bottom, left, or right side) of the sheet of print media is leading (i.e., being fed into an imaging assembly of the imaging device). The encoding scheme is based on the imaging device reading indicia from the print media in a predetermined direction such as reading the marked indicia from left-to-right, right-to-left, top-to-bottom, bottom-to-top, or in some diagonal manner.

Figure 3:
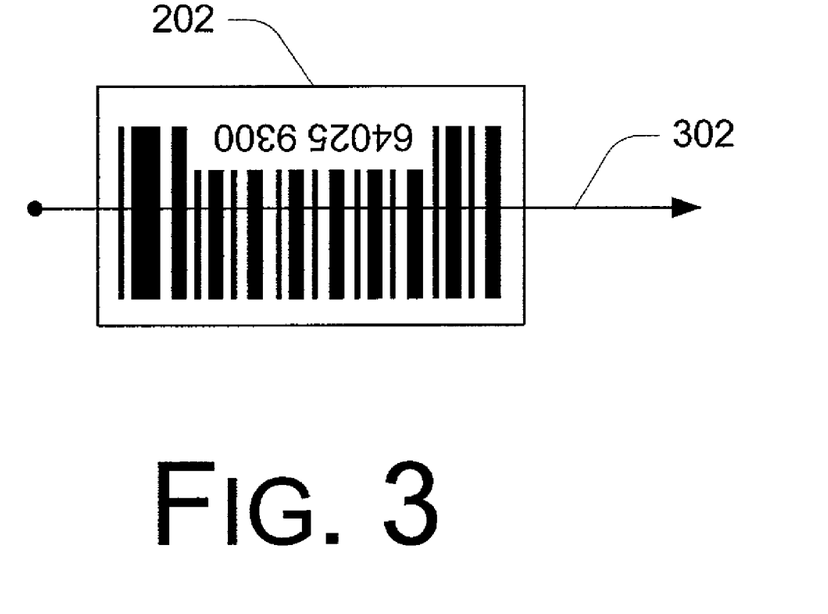
FIGS. 3 and 4 show indicia marked on the side of print media (e.g., a number of bars in a barcode) are reversed if a sheet of print media (i.e., the sheet 200 of FIG. 2) is loaded into an imaging device facedown as shown in FIG. 3, rather than loaded into the device face-up as shown in FIG. 4.
Figure 4:
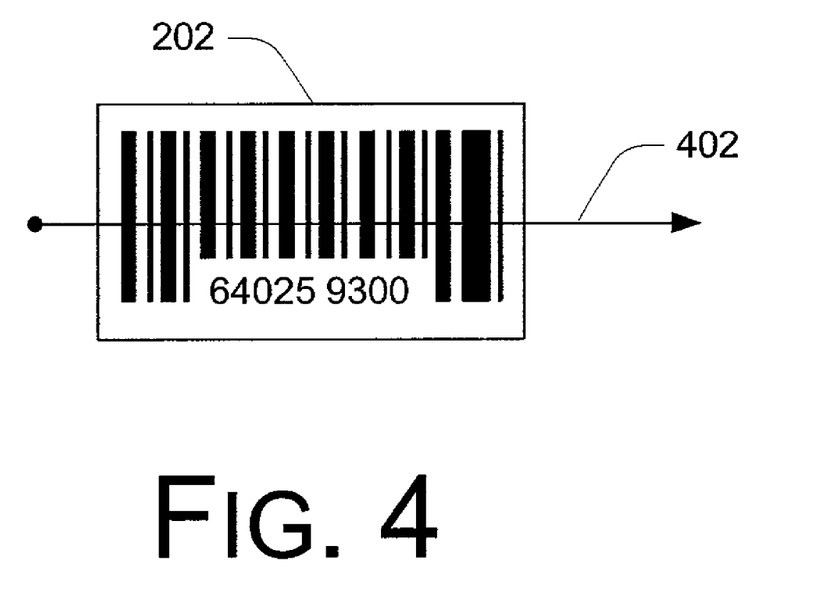

FIGS. 3 and 4 are block diagrams that show that indicia 202 that are marked on the side of print media (e.g., a number of bars in a barcode) are reversed if a sheet of print media (i.e., the sheet 200 of FIG. 2) is loaded into an imaging device facedown as shown in FIG. 3, rather than loaded into the device face-up as shown in FIG. 4. The arrows 302 and 402 indicate that the imaging device is reading the indicia from the left to the right. The indicia's encoding scheme is based on this reversal of information that depends on whether print media is loaded facedown or face-up into the imaging device.

Figure 5:
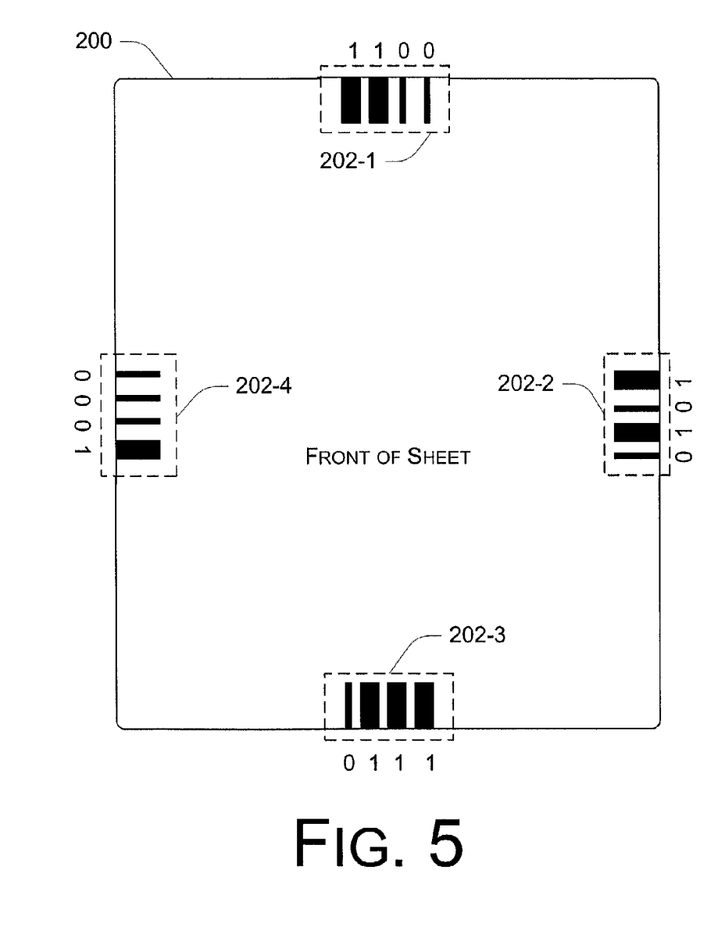
FIG. 5 shows an exemplary encoding of orientation information from the perspective of a sheet of print media that is loaded face-up in an imaging device.
Figure 6:
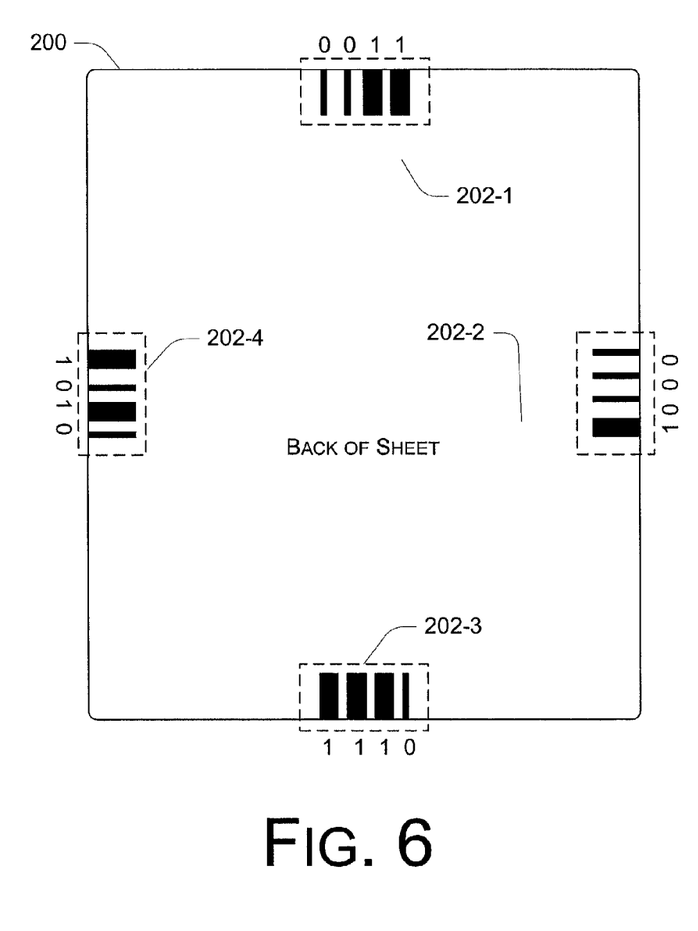
FIG. 6 shows an exemplary encoding of orientation information from the perspective of a sheet of print media that is loaded facedown in an imaging device.

FIGS. 5 and 6 are block diagrams that show an exemplary encoding of print media orientation information in marked indicia 202 on a sheet of print media 200. Specifically, FIG. 5 shows an exemplary encoding of orientation information from the perspective of a sheet of print media that is loaded face-up in an imaging device. And, FIG. 6 shows an exemplary encoding of orientation information from the perspective of a sheet of print media that is loaded facedown in an imaging device.

Although FIGS. 5 and 6 illustrate the indicia 202 on the front and back face of the print media, this is done for ease of illustrating the encoding scheme of the indicia. The described subject matter applies to marking single indicia on each of the four (4) sides of a sheet of print media, or four (4) indicia per sheet of print media. However, the side imprinted indicia may be purposefully bled from an edge onto the front and/or back face of a sheet of print media as described in greater detail in U.S. patent application Ser. No. 09/981,885, titled "Media Imprinted with Media Parameter Information" which was filed on Oct. 17, 2001, and which is assigned to the assignee hereof, and which is hereby incorporated by reference.

In this configuration, each marking code 202 starts of ends with a zero ("0") and ends with a one ("1"), or a starts with a "1" and ends with a "0". In particular, the code starts with a "0" and ends with a "1" when a sheet of print media 200 is loaded into an imaging device in a face-up position as illustrated in FIG. 5. The code starts with a "1" and ends with a "0" when the sheet of print media is loaded facedown into the imaging device as shown in FIG. 6.

In this exemplary configuration, if an imaging device detects and reads a code 202 left to right that starts with a "0" and ends with a "1", it indicates to the device that the corresponding sheet of print media is loaded into the imaging device in a face-up position and that the remaining bits of the code are to be read from left-to-right. However, if the device detects and reads a code 202 left to right that starts with a "1" and ends with a "0", it indicates to the device that the corresponding sheet of print media is loaded into the imaging device in a facedown position and that the remaining bits of the code are to be read from right-to-left. In other words, a code such as "0 . . . 1" indicates that the remaining code (" . . . ") is to be read from left-to-right. And, a code such as "1 . . . 0" indicates that the remaining code (" . . . ") is to be read from right-to-left.

Once an imaging device determines a facial orientation of the sheet of print media (i.e., that the sheet is face-up or facedown), this configuration utilizes the remaining bits such as the middle bits (" . . . ") to determine the media parameters and to determine which side (top, bottom, left, or right side) of the sheet of print media that is being read.

To illustrate this, consider that on this exemplary print media sheet 200 as shown in FIGS. 5 and 6, remaining bits equivalent to "00" at a predetermined position indicates that the left side of the sheet is being sensed, the remaining bits "10" indicate the right side, remaining bits "01" indicate the top side, and remaining bits "11" indicate that the bottom side is being detected. (Note, the remaining bits are read from left-to-right or from right-to-left based on the determined facial orientation of the sheet of print media).

Thus, "0001" indicates face up, left side; "0011" indicates face up, top side; "0101" indicates face up, right side; "0111" indicates face up, bottom side; "1000" indicates face down, left side; "1010" indicates face down, right side, "1100" indicates face down, top side, and "1110" indicates face down, bottom side. If appropriate to the particular implementation, other media parameters such as those described above are identified by other predetermined codes in predetermined locations of the indicia 202. This particular encoding scheme is an example. There may be any number of different encoding schemes.

For example, although this configuration selects an encoding scheme 202 to begin and end with specific numerals, any number of different encoding schemes can be used to indicate that a sheet of print media is loaded in a particular orientation. For example, predetermined indicia may be located at any one of a number of particular positions in a code to indicate the facial orientation of a sheet of print media and to indicate other print media information such as information indicating a particular side that is being sensed.

To illustrate this, consider that a coding scheme 202 may start with a first punctuation or letter such as "A" in the first position of the code and end with a second punctuation or letter such as "B" at a last code position to indicate that a sheet of print media is loaded in the face-up position. Other media parameter information such as which side is being read or other data (e.g., media type, etc.) is located at predetermined positions that are located between the "A" and the "B" positions. In the same scheme, detecting the second punctuation or letter (e.g., "B") before the first punctuation or letter (e.g., "A") at any position in a code may indicate that the print media is loaded into the imaging device in a facedown position, and all other bits may indicate the other media parameters.

In this manner, only a single print media sheet mark indicia sensor per side of print media is required by an imaging device to detect any facial orientation and/or side information of a print media sheet that is being detected. (An exemplary imaging device 712 and imaging sensors 816 are described in greater detail below in reference to FIGS. 8 and 9). This is substantially beneficial because it may save cost and complexity in an imaging device's fabrication. For example, the described subject matter requires only a single (1) sensor to identify the particular orientation of a marked sheet of print media. In contrast to this, conventional systems typically require two barcode sensors to determine the orientation of print media such as the print media 100 of FIG. 1, which has 8 marks per page of print media (2 marks per side).

Moreover, because only a single marking per side of print media is required to provide facial orientation and information corresponding to which side is being sensed by an imaging device, print media marking costs may be substantially reduced as compared to the costs of conventional marking schemes. For example, marking the media a single time on each side (i.e., four (4) marks per sheet of print media) requires less marking material to implement as compared to systems and procedures that require two marks per side (i.e., the eight (8) marks mark per page shown by prior art print media 100 of FIG. 1).

An Exemplary Image Forming System

Figure 7:
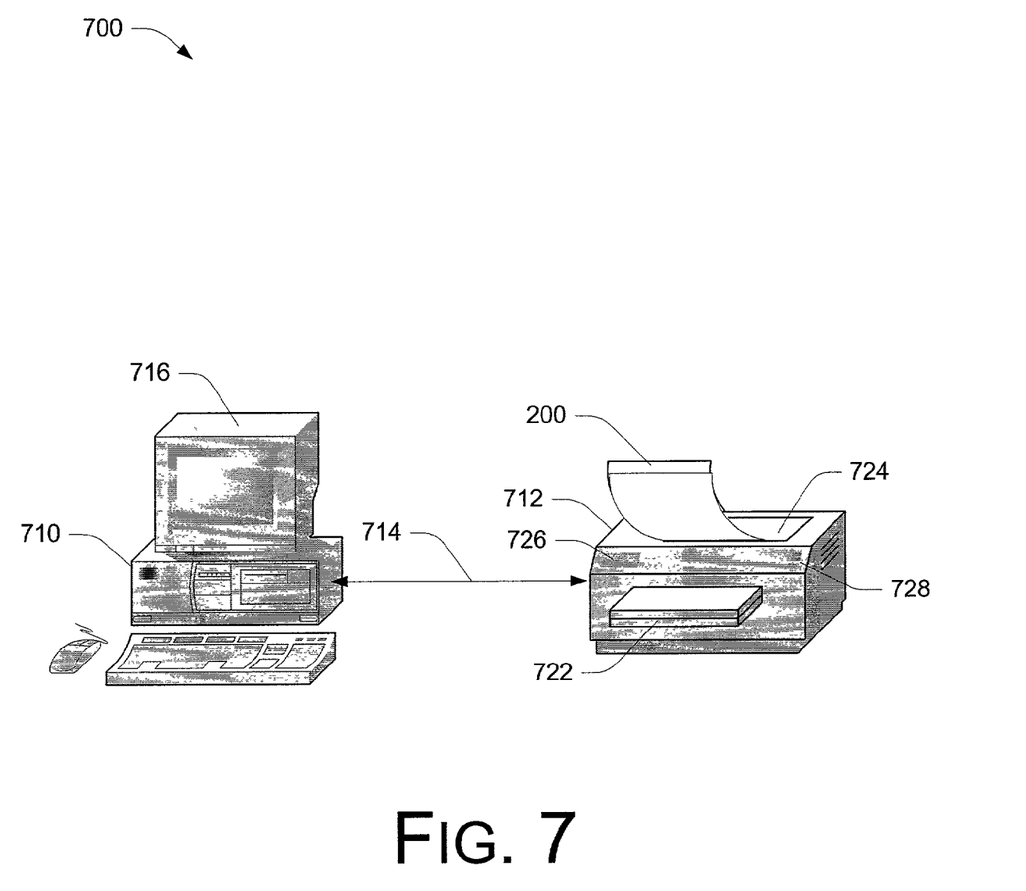
FIG. 7 illustrates an exemplary image forming system, which includes a host device, an image-forming device, and a communication medium operatively coupling the host device to the imaging device.

FIG. 7 is a block diagram of an exemplary image forming system 700, which includes a host device 710, an image-Forming device 712, and a communication medium 714 operatively coupling the host device to the imaging device. The host device is implemented as a personal computer (PC), server, Web Server, or other device configured to communicate with image forming devices. The host device optionally includes a display 716 such as a CRT or flat-panel monitor to display information to a user.

An exemplary communication medium 714 includes a parallel connection, packet switched network, such as an intranet network (e.g., an Ethernet arrangement), and/or Internet, and other communication configurations operable to provide electronic exchange of information between the host device 710 and the image forming device 712 using an appropriate protocol. Other image forming system arrangements are possible including additional host devices and/or additional image forming devices coupled to the communication medium.

The image forming device 712 is configured to form images upon print media 718. One exemplary image-forming device is a printer, such as a laser printer, inkjet printer, a dot matrix printer, a dry medium printer, or a plotter. The described subject matter is embodied within other image forming device configurations such as multiple function peripheral devices, copiers, facsimile machines, plotters, and the like. The imaging device includes one or more print media supply bins 722, or trays into which print media are loaded.

The imaging device 712 is arranged to form images upon the print media 200 (see, also print media 200 of FIG. 2) including, for example, paper, envelopes, transparencies, labels, etc. Print media may be in a number of different forms such as a stack, or a ream of print media. Different types of print media have various weights, surface finishes, roughness, wicking properties, etc., which impact equality of images formed thereupon by the imaging device.

In this example, the print media 200 includes a single indicia, or marking such as a barcode on each of the print media's four (4) sides. The print media shown in the output bin 724 has already presented to the imaging device, a number of media parameters to substantially optimally configure the device's imaging operations. An exemplary procedure for an imaging device to sense and configure its operating parameters based on media parameter information provided by a print media's marked indicia is described in greater detail below in reference to FIG. 10.)

An Exemplary Image Forming Device

Figure 8:
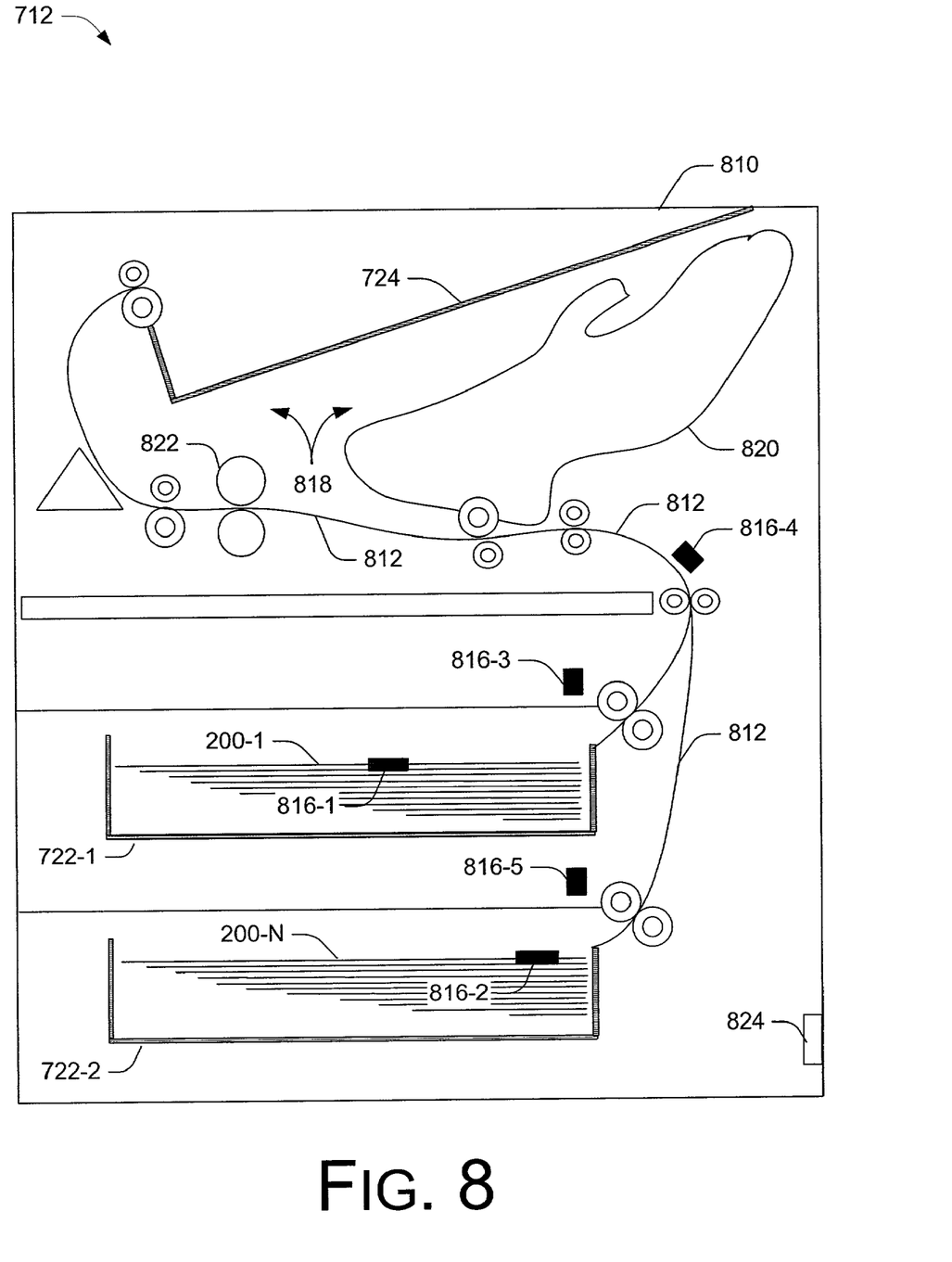
FIG. 8 shows further details of an exemplary arrangement of an image forming device of FIG. 7.

FIG. 8 is a block diagram that shows further details of an exemplary arrangement of image forming device 712 of FIG. 7. The image-forming device includes a housing 810 arranged to define a media path 812 to guide media within the housing. For example, a plurality of rollers is arranged within the housing to define the media path and to direct print media 200 (see, print media sheet 200 of FIG. 2) from one or more media supplies 722 (e.g., media trays 722 of FIG. 7) to an output tray 724 (see, output tray 724 of FIG. 7). In this configuration, the media is loaded sheet-by-sheet from the stack by the rollers.

In the depicted arrangement, the device 712 includes a plurality of media supplies 722. A first and second media supply 722-1 and 722-2 include respective stacks, or reams of print media 200. Each sheet 200 in the stack has a respective single marking with information thereon (e.g., a barcode) imprinted on each side of the sheet. Each respective marking has data thereon that is used by the device 712 to substantially optimally configure itself to form images upon the print media. The data is read from each respect sheet in a stack of print media as each sheet is picked from the stack and read by a sensor 816 that is described in further detail below.

The exemplary image-forming device 712 further includes an image engine 818 adjacent media path 812 and arranged to print or otherwise form images upon media 200. An exemplary image engine includes a print engine including a developing assembly 820 and a fusing assembly 822 in the depicted configuration. Control circuitry of the device is configured to control operations of device 712 including controlling operations of developing and fusing assemblies 820 and 822 as described in further detail below.

The image-forming device 712 includes one or more marking sensors 816 (e.g., an optical sensor) configured to read data within markings 202 of FIG. 2 imprinted on a media sheet 200. Such indicia are positioned on each print media sheet such that they can be sensed from any orientation as long as a sensor is properly positioned to sense the indicia. Accordingly, plural configurations of sensor 816 are possible.

For example sensors can be positioned in the paper path 812 (e.g., sensors 816-3 and 816-4 are located along the media path), and/or adjacent to the media supply bin 722 (e.g., sensors 816-1 and 8162). In this configuration, a sensor positioning in the paper path is optimal as the information provided on a media sheet 200 is read as the media is pulled through the print path.

Image forming device 712 includes an interface 824 configured to couple with a communications medium (e.g., the communication media 714 of FIG. 7) for implementing communications externally of device 712 with host device 710 or other external devices. Interface 824 receives image data from the communication medium and the imaging device subsequently forms images upon print media 718 using image data received via interface 824. In one configuration, interface 824 is implemented as a JetDirect® card that is available from Hewlett-Packard Company.

Figure 9:
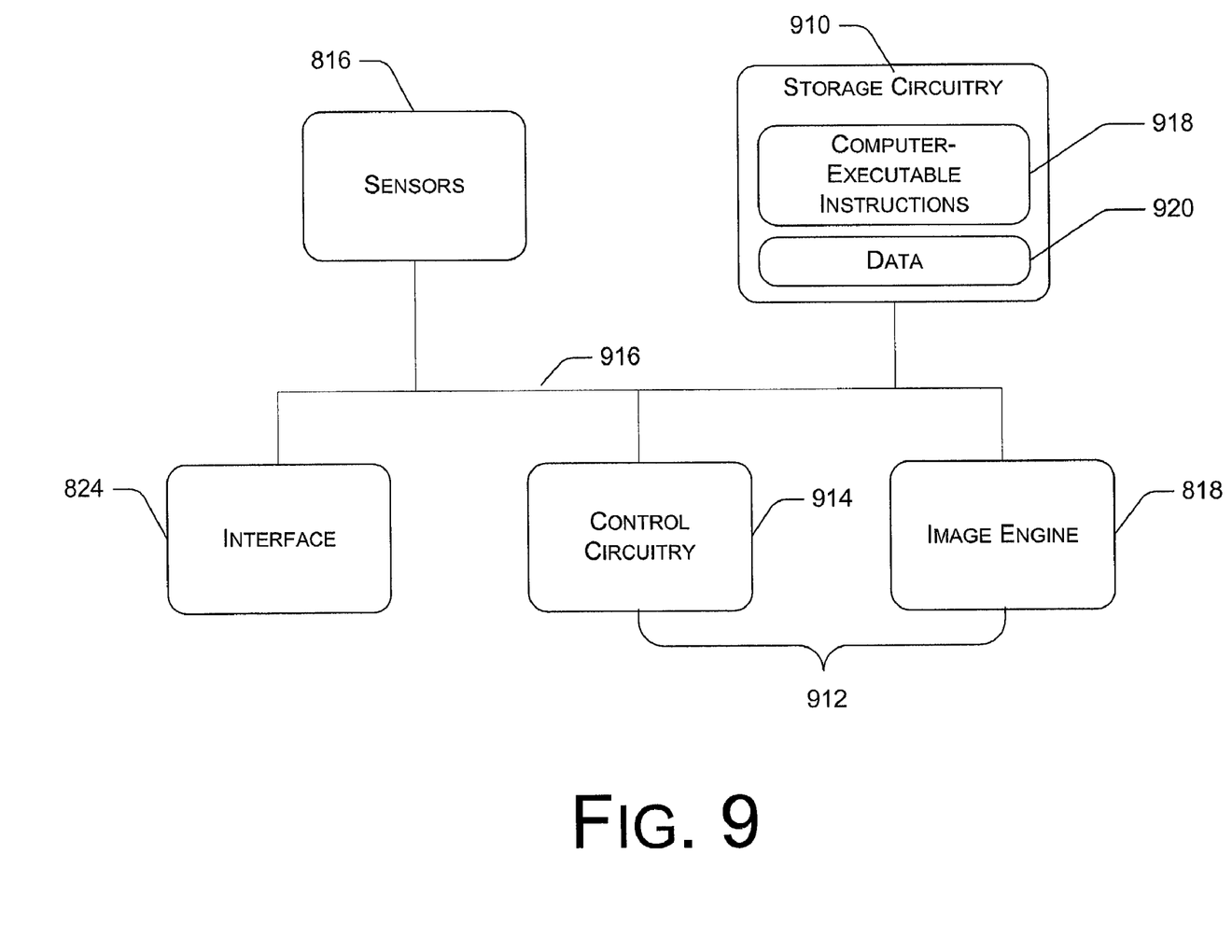
FIG. 9 shows exemplary electrical components to control operations of an image forming device of FIGS. 7 and 8.

FIG. 9 is a block diagram that shows exemplary electrical components to control operations of image forming device 712. The depicted electrical circuitry includes sensors 816, interface 824, storage circuitry 910 and imaging circuitry 912 (imaging circuitry 912 includes control circuitry 914 and image engine 818 comprising assembly's 820 and 822 of FIG. 8). Further a communication medium 916 configured to implement appropriate communications is provided intermediate internal components of image forming device 712. In one arrangement, communication medium 916 is implemented as a bidirectional bus.

Storage circuitry 910 is configured to store electrical information such as image data for using and formulating hard images and instructions usable by control circuitry 914 for implementing image-forming operations within device 712 of FIGS. 7 and 8. Exemplary storage circuitry includes nonvolatile memory (e.g., flash memory, EEPROM, and/or read-only memory (ROM)), random access memory (RAM), and hard disk and associated drive circuitry.

Control circuitry 914 implements processing of image data (e.g., rasterization) received via interface 824. Further, control circuitry 914 of imaging circuitry 912 performs functions with respect to the formation of images including controlling operations of image engine 818 including developing assembly 820 and fusing assembly 822 in the described configuration. For example, control circuitry 914 obtains data via appropriate signals from one or more of sensors 816 and adjusts imaging parameters of image engine 818 during formation of images.

An exemplary configuration of control circuitry 914 is implemented as a processor such as a dedicated microprocessor configured to fetch and execute computer-executable instructions 918 that are stored in storage circuitry 910. The control circuitry is also configured to fetch data 920 from the storage circuitry during the execution of the computer-executable instructions. The computer-executable instructions configure the image-forming device 712 according to the type and/or orientation of print media 200 being imaged upon.

For example, different types of media 200 of FIG. 2 (as well as different sides of print media) have various weights, surface finishes, roughness, wicking properties, etc., which impact equality of images formed thereupon. The imaging parameters of device 712 including those of image engine 818 are adjusted by the control circuitry 914 in conjunction with the computer-executable instructions 918 to optimize the formation of quality images upon media 718 responsive to the types of media utilized as indicated by the data imprinted on a media sheet 200.

In one configuration, storage circuitry 910 is configured to store a plurality of settings for one or more imaging parameters corresponding to a plurality of respective media types. Such settings are identified, for example, in a lookup table within data 920. Upon identification of a media sheet 200 by a sensor 816, the appropriate media parameters are obtained by control circuitry 914 for configuring device 712. The parameters settings may be used directly to configure device 712 or for providing initial settings which may be subsequently modified based on other information to optimize imaging.

Exemplary Procedure Using Media Parameter Information Sheet

Figure 10:
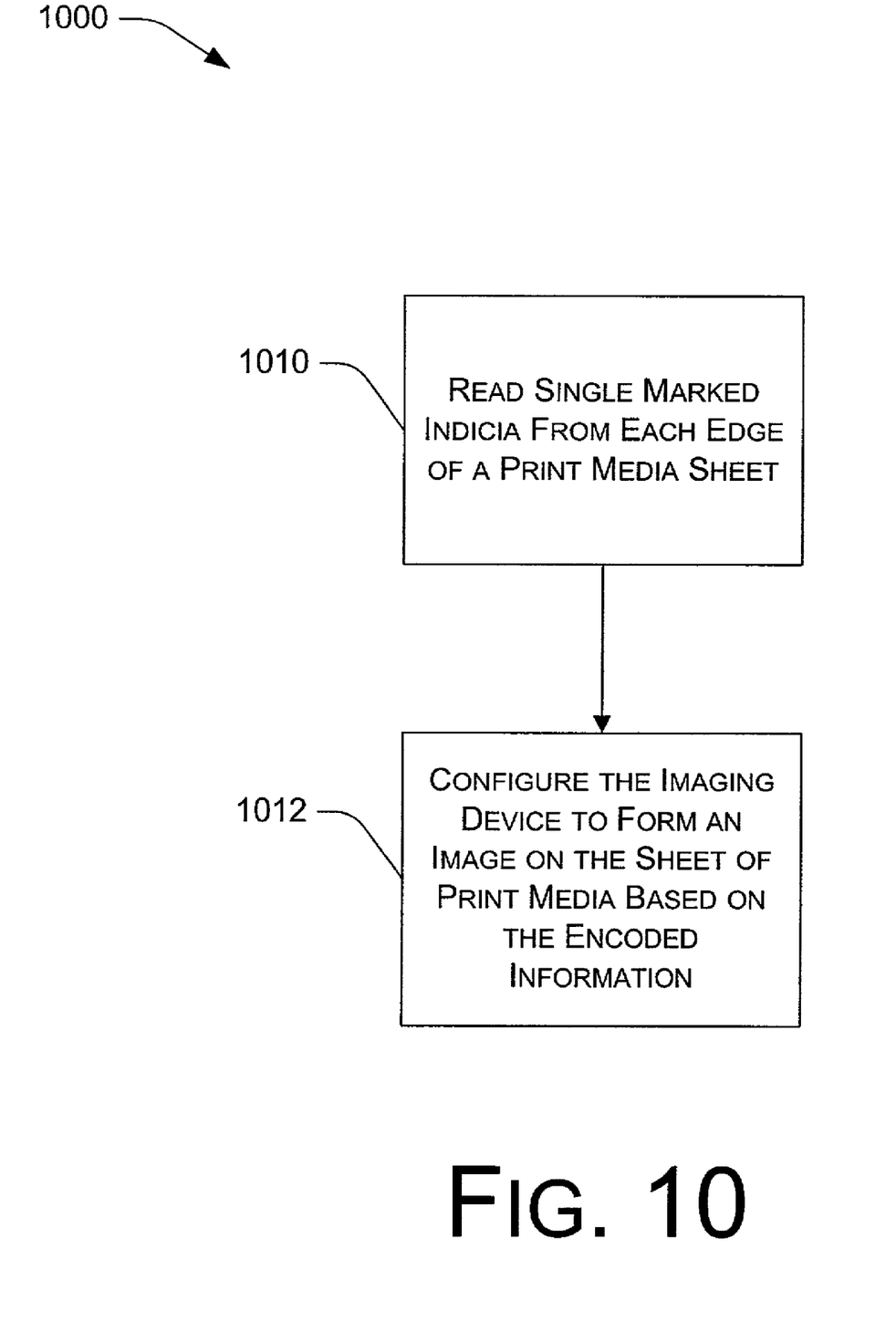
FIG. 10 shows an exemplary procedure to optimize imaging device operations based on print media information that is imprinted in a single marking on each of the sides of a sheet of print media.

FIG. 10 shows an exemplary procedure 1000 to optimize imaging device operations based on print media information. At block 1010, an imaging device reads information that is imprinted a single time on each of the four sides of a sheet of print media. As described above in reference to FIGS. 4–6, the encoding scheme used in the marked indicia is designed such that the information can be sensed and properly interpreted by the device regardless of whether the sheet of print media has been loaded into the device face-up or facedown. At block 1012, the imaging device uses the information to substantially optimally configure image-forming operations to form an image on the sheet of print media 200.

CONCLUSION

Although the subject matter has been described in language specific to structural features and/or methodological operations, it is to be understood that the subject matter defined in the appended claims is not necessarily limited to the specific features or operations described. Rather, the specific features and operations are disclosed as preferred forms of implementing the claimed invention.

The invention claimed is:

1. In an imaging device loaded with a sheet of print media, a method for automatically configuring the imaging device to form images on the sheet of print media, the method comprising:
   reading a single marking from at least one side of the sheet of print media, the marking representing machine readable data indicating the side along which the marking is located and including media parameter information corresponding to the sheet of print media;
   determining the side of the sheet of print media on which the marking is located based on at least a portion of the data; and
   configuring the imaging device to form images on the sheet of print media based on at least a portion of the data.

2. A method as recited in claim 1, wherein the single marking comprises at least one of four single markings each of which is located along a different one of the four sides of the sheet of print media such that the imaging device can read the marking independent of any particular orientation of the sheet of print media.

3. A method as recited in claim 1, wherein the single marking comprises at least one of four single barcodes each of which is located along a different one of the four sides of the sheet of print media.

4. A method as recited in claim 3, wherein each of the single barcodes includes bits of code indicating whether the sheet or print media is face-up or face-down and that the remaining bits of code are to be read from left-to-right or right-to-left.

5. A method as recited in claim 1, wherein the single marking comprises a marking representing machine readable data indicating the side along which the marking is located and whether the sheet of print media is face-up or face-down and including media parameter information corresponding to the sheet of print media.

6. A computer-readable medium comprising computer-executable instructions for automatically configuring an imaging device to form images on a sheet print media that is loaded into the imaging device, the computer-executable instructions comprising instructions for:

reading a single marking from at least one side of the sheet of print media, the marking representing machine readable data indicating the side along which the marking is located and including media parameter information corresponding to the sheet of print media;

determining the side of the sheet of print media on which the marking is located based on at least a portion of the data; and configuring the imaging device to form images on the sheet of print media based on at least a portion of the data.

7. A computer-readable medium as recited in claim 6, wherein the single marking comprises at least one of four single markings each of which is located along a different one of the four sides of the sheet of print media such that the imaging device can read the marking independent of any particular orientation of the sheet of print media.

8. A computer-readable medium as recited in claim 6, wherein the single marking comprises at least one of four single barcodes each of which is located along a different one of the four sides of the sheet of print media.

9. A computer-readable medium as recited in claim 8, wherein each of the single barcodes includes bits of code indicating whether the sheet or print media is face-up or facedown and that the remaining bits of code are to be read from left-to-right or right-to-left.

10. A computer-readable medium as recited in claim 6, wherein the single marking comprises a marking representing machine readable data indicating the side along which the marking is located and whether the sheet of print media is face-up or face-down and including media parameter information corresponding to the sheet of print media.

11. An imaging device comprising:

a memory comprising computer-executable instructions for automatically configuring the imaging device to form images on a sheet of print media that is loaded in a media supply bin; and a processor that is operatively coupled to the memory, the processor being configured to fetch and execute the computer-executable instructions from the memory, the computer-executable instructions comprising instructions for:

reading a single marking from at least one side of the sheet of print media, the marking representing machine readable data indicating the side along which the marking is located and including media parameter information corresponding to the sheet of print media;

determining the side of the sheet of print media on which the marking is located based on at least a portion of the data; and configuring the imaging device to form images on the sheet of print media based on at least a portion of the data.

12. An imaging device as recited in claim 11, wherein the single marking comprises at least one of four single markings each of which is located along a different one of the four sides of the sheet of print media such that the imaging device can read the marking independent of any particular orientation of the sheet of print media.

13. An imaging device as recited in claim 11, wherein the single marking comprises at least one of four single barcodes each of which is located along a different one of the four sides of the sheet of print media.

14. An imaging device as recited in claim 13, wherein each of the single barcodes includes bits of code indicating whether the sheet or print media is face-up or face-down and that the remaining bits of code are to be read from left-to-right or right-to-left.

15. An imaging device as recited in claim 11, wherein the single marking comprises a marking representing machine readable data indicating the side along which the marking is located and whether the sheet of print media is face-up or face-down and including media parameter information corresponding to the sheet of print media.

* * * * *

UNITED STATES PATENT AND TRADEMARK OFFICE
CERTIFICATE OF CORRECTION

| | | |
|---|---|---|
| PATENT NO. | : 7,102,798 B2 | Page 1 of 1 |
| APPLICATION NO. | : 09/981152 | |
| DATED | : September 5, 2006 | |
| INVENTOR(S) | : Robert E. Haines et al. | |

It is certified that error appears in the above-identified patent and that said Letters Patent is hereby corrected as shown below:

In column 6, line 59, delete "8162" and insert -- 816-2 --, therefor.

In column 9, line 25, in Claim 9, delete "facedown" and insert -- face-down --, therefor.

Signed and Sealed this

Twentieth Day of January, 2009

JON W. DUDAS
*Director of the United States Patent and Trademark Office*